(12) United States Patent
Maaref

(10) Patent No.: US 10,333,592 B2
(45) Date of Patent: Jun. 25, 2019

(54) SYSTEM AND METHOD FOR INTERFERENCE AVOIDANCE BASED ON SIGNAL ALIGNMENT IN TWO-TIER MIMO OFDM

(71) Applicant: Huawei Technologies Co., Ltd., Shenzhen (CN)

(72) Inventor: Amine Maaref, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 158 days.

(21) Appl. No.: 13/929,493

(22) Filed: Jun. 27, 2013

(65) Prior Publication Data

US 2015/0003547 A1  Jan. 1, 2015

(51) Int. Cl.
*H04B 7/0426* (2017.01)
*H04W 24/02* (2009.01)

(52) U.S. Cl.
CPC .......... *H04B 7/0426* (2013.01); *H04W 24/02* (2013.01)

(58) Field of Classification Search
CPC .. H04B 17/00; H04B 7/06; H04B 7/04; H04L 5/0032; H04L 5/0036; H04W 16/10
See application file for complete search history.

(56) References Cited

U.S. PATENT DOCUMENTS

| 8,032,160 | B2 * | 10/2011 | Trott | ................... | H04W 16/10 455/456.1 |
| 2006/0067420 | A1 | 3/2006 | Li et al. | | |
| 2009/0003266 | A1 | 1/2009 | Stolyar et al. | | |

(Continued)

FOREIGN PATENT DOCUMENTS

| CN | 101662321 | * | 5/2013 | ............ H04B 17/00 |
| WO | 2011132988 A2 | | 10/2011 | |

OTHER PUBLICATIONS

L. Lu and Geoffrey Ye Li, "Signal alignment for two-cell CR networks,"2013 IEEE Wireless Communications and Networking Conference (WCNC), Shanghai, Shanghai, Chinam 2013, pp. 3568-3572.*

(Continued)

*Primary Examiner* — Patrick N Edouard
*Assistant Examiner* — Eboni N Hughes
(74) *Attorney, Agent, or Firm* — Slater Matsil, LLP

(57) ABSTRACT

Embodiments are provided for interference avoidance based on signal alignment for multiple-input and multiple-output (MIMO) with orthogonal frequency-division multiplexing (OFDM) or OFDM access (OFDMA). The embodiments include a signal alignment scheme using both spatial and frequency dimensions. The scheme includes an existing link between an existing transmitter and an existing receiver, and a new link between a new transmitter and a new receiver. The new transmitter determines combinations of space dimensions and frequency dimensions unused in transmission on an existing link, and assigns signals for transmission on the new link at one or more of the unused combinations of space dimensions and frequency dimensions. The existing receiver is further configured to reallocate its power to release, using a greedy search algorithm, a small eigenvalue algorithm, or a best throughput algorithm, a null space of some space dimensions to the new transmitter.

16 Claims, 3 Drawing Sheets

(56) References Cited

U.S. PATENT DOCUMENTS

| | | | |
|---|---|---|---|
| 2009/0207735 A1* | 8/2009 | Ben Letaief | H04L 5/0032 370/237 |
| 2010/0056167 A1* | 3/2010 | Guvenc | H04L 5/0007 455/450 |
| 2012/0288021 A1* | 11/2012 | Park | H04B 7/024 375/260 |
| 2013/0059543 A1* | 3/2013 | Kiukkonen | H04L 27/0006 455/67.11 |
| 2014/0126666 A1* | 5/2014 | Goldsmith | H04B 7/024 375/295 |

OTHER PUBLICATIONS

2013 IEEE WCNC Program (PHY Track) retrieved from http://wcnc2013.ieee-wcnc.org/techsessions.html, 14 pgs.*

Maso, Marco, et al., "Cognitive Interference Alignment for Heterogeneous Two-tiered Self-organizing Networks," Department of Information Engineering, University of Padova, Italy, Feb. 20, 2013, 32 pages.

Maso, Marco, et al., "Cognitive Orthogonal Precoder for Two-Tiered Networks Deployment," IEEE, Feb. 20, 2013, 11 pages.

Perlaza, Samir Medina, et al., "Opportunistic Interference Alignment in MIMO Interference Channels," France R&D, Jun. 24, 2008, 5 pages.

Krikidis, Ioannis, "Space Alignment for Cognitive Transmission in MIMO Uplink Channels," EURASIP Journal on Wireless Communications and Networking, vol. 2010, Article ID 465157, Jul. 5, 2010, 6 pages.

Cardoso, Leonardo S., et al., "Vandermonde Frequency Division Multiplexing for Cognitive Radio," SUPELEC, Gif-sur-Yvette, France University of Oslo, Oslo, Norway, Mar. 6, 2008, 5 pages.

International Search Report received in Application No. PCT/CN2014/080049, dated Sep. 1, 2014, 12 pages.

Abdelhamid, B., et al., "Novel Interference Alignment in Multi-Secondary Users Cognitive Radio System," 2012 IEEE Symposium on Computers and Communications (ISCC), Jul. 1-4, 2012, pp. 000785-000789.

Amir, M., et al., "Opportunistic Interference Alignment for Multiuser Cognitive Radio," 2010 IEEE Information Theory Workshop (ITW), Jan. 6-8, 2010, pp. 1-5.

Bai, X., "Space Alignment Based on Primary Transmission-Outage for Cognitive Transmission," Electronics Letters, vol. 48, No. 19, Sep. 13, 2012, 2 pages.

Bixio, L. et al., "Cognitive Radios with Multiple Antennas Exploiting Spatial Oppurtunities," IEEE Transactions on Signal Processing, vol. 58, No. 8, Aug. 2010, pp. 4453-4459.

Cadambe, V.R., et al., "Interference Alignment and Degrees of Freedom of the K-User Interference Channel," IEEE Transactions on Information Theory, vol. 54, No. 8, Aug. 2008, pp. 3425-3441.

Cardoso, L. S., et al., "Orthogonal LTE two-tier Cellular Networks," 2011 IEEE International Conference on Communications (ICC), Jun. 5-9, 2011, 5 pages.

Gou, T., et al., "Improved and Oppurtunistic Interference Alignment for Multi-Cell Interference Channels," 2012 75th IEEE Vehicular Technology Conference (VTC Spring), May 6-9, 2012, pp. 1-5.

Huppert, C., "Opportunistic Resource Allocation in MIMO Cognitive Systems with Multiple Users," 2011 International ITG Workshop on Smart Antennas (WSA), Feb. 24-25, 2011, pp. 1-6.

Jänis, P., et al., "Interference-avoiding MIMO Schemes for Device-to-Device Radio Underlaying Cellular Networks," 2009 IEEE 20th International Symposium on Personal, Indoor and Mobile Radio Communications, Sep. 13-16, 2009, 5 pages.

Perlaza, S. M., et al., "From Spectrum Pooling to Space Pooling: Opportunistic Interference Alignment in MIMO Cognitive Networks," IEEE Transactions on Signal Processing, vol. 58, No. 7, Jul. 2010, pp. 3728-3741.

Shin, W., et al., "Hierarchical Interference Alignment for Heterogeneous Networks with Multiple Antennas," 2011 IEEE International Conference on Communications Workshops (ICC), Jun. 5-9, 2011, 6 pages.

Stüber, G. L., et al., "Broadband MIMO-OFDM Wireless Communications," Proceedings of the IEEE, vol. 92, No. 2, Feb. 2004, pp. 271-294.

Tse, D. et al., "Fundamentals of Wireless Communication," © 2005, Cambridge University Press, 582 pages.

* cited by examiner

SYSTEM AND METHOD FOR INTERFERENCE AVOIDANCE BASED ON SIGNAL ALIGNMENT IN TWO-TIER MIMO OFDM

TECHNICAL FIELD

The present invention relates to the field of network communications, and, in particular embodiments, to a system and method for interference avoidance based on signal alignment in two-tier MIMO OFDM or similar technology.

BACKGROUND

With the increased demand on high-speed wireless communications, more spectrum resources are required for transmissions. To improve spectrum efficiency, novel transmission schemes, such as interference alignment, have been proposed to allow new links to access channels if an existing link is not interfered. The schemes include using unused spatial dimensions of the existing link. Instead of using spatial dimensions, subspace frequency division multiplexing has also been proposed, such as exploiting extra dimensions of cyclic prefix (CP) of orthogonal frequency-division multiplexing (OFDM) in an existing link. Such scheme uses single-antenna systems. This scheme may have improved performance over the spatial dimension exploiting scheme but performance is limited by the length of CP. To further improve the system performance, there is a need for a scheme that can exploit both spatial dimensions and frequency division, such as for multiple-input and multiple-output (MIMO) and OFDM systems.

SUMMARY OF THE INVENTION

In accordance with an embodiment, a method by a network component, for generating new links for communications in a wireless network that avoid interference to existing links, includes determining combinations of space dimensions and frequency dimensions unused in transmission on an existing link between an existing transmitter and an existing receiver. The method further includes assigning signals for transmission on a new link, between a new transmitter and a new receiver, at one or more of the unused combinations of the space dimensions and frequency dimensions. The assigned signals are non-interfering with and distinguishable by the existing receiver from transmission on the existing link.

In accordance with another embodiment, a network component for a new transmitter is configured for generating new links for communications in a wireless network that avoid interference to existing links. The network component includes at least one processor and a computer readable storage medium storing programming for execution by the at least one processor. The programming includes instructions to determine combinations of space dimensions and frequency dimensions unused in transmission on an existing link between an existing transmitter and an existing receiver. The transmitter is also configured to assign signals for transmission on a new link, between the new transmitter and a new receiver, at one or more of the unused combinations of the space dimensions and frequency dimensions. The assigned signals are non-interfering with and distinguishable by the existing receiver from transmission on the existing link.

In accordance with another embodiment, a method for enabling new links for communications in a wireless network that avoid interference to existing links includes obtaining channel precoding information for signals on the existing link. The signals correspond to multiple antenna transmissions from an existing transmitter to an existing receiver. The method further includes implementing, using combined space dimensions and frequency dimensions, channel postcoding for the signals on the existing link. A null space of zero power allocation for the signals is then selected on some of the space dimensions, and power for transmissions for the signals is allocated on remaining space dimensions. The null space of zero power allocation is sent to a new transmitter of the new link.

In accordance with another embodiment, a network component for an existing receiver enabling new links for communications in a wireless network that avoid interference to existing links. The network component includes at least one processor and a computer readable storage medium storing programming for execution by the at least one processor. The programming includes instructions to obtain channel precoding information for signals on the existing link. The signals correspond to multiple antenna transmissions from an existing transmitter to the existing receiver. The network component also implements, using combined space dimensions and frequency dimensions, channel postcoding for the signals on the existing link, selects a null space of zero power allocation for the signals on some of the space dimensions, and allocates power for transmissions for the signals on remaining space dimensions. The null space of zero power allocation is further sent to a new transmitter of the new link.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
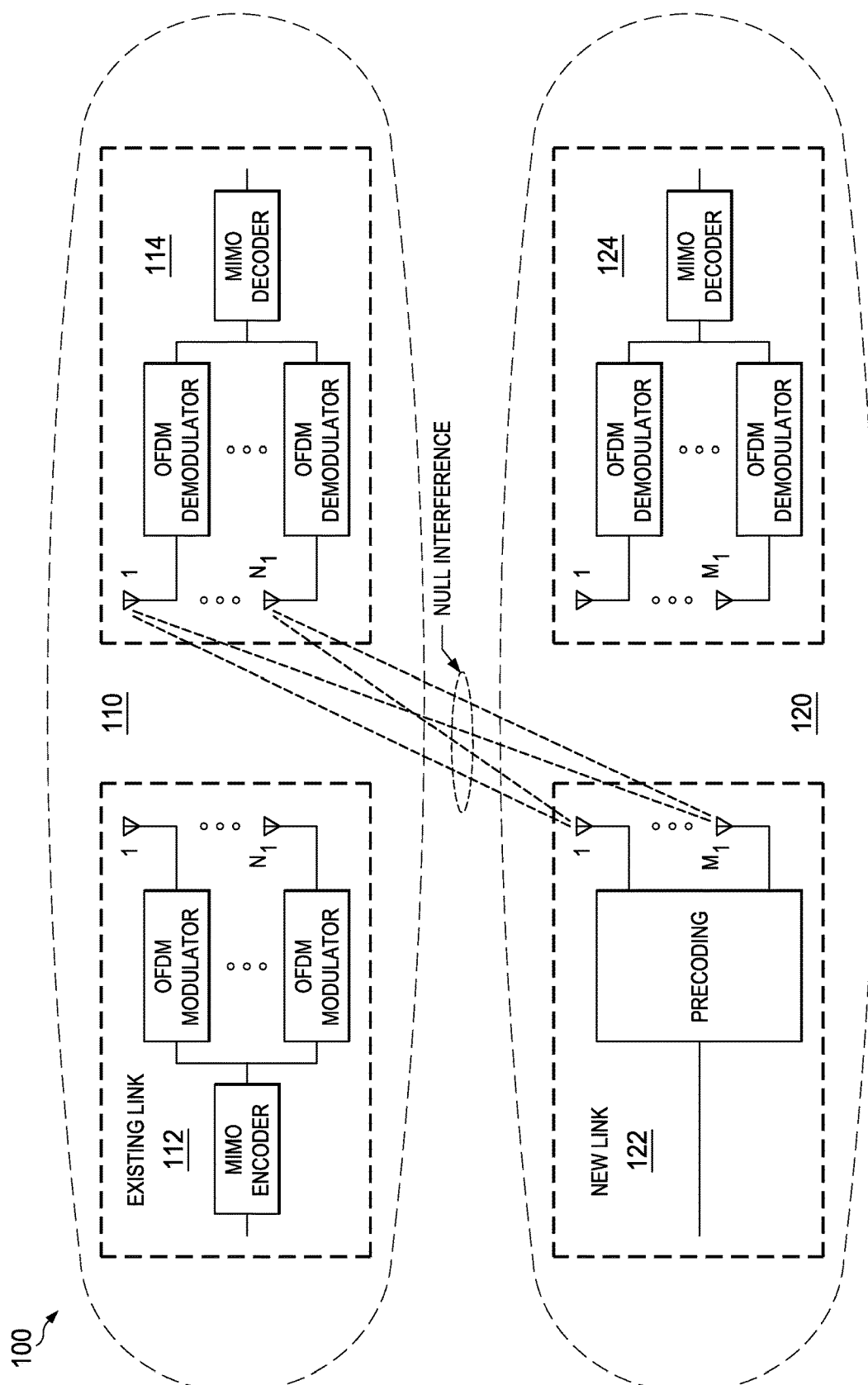
FIG. 1 illustrates an embodiment of a MIMO-OFDM system.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein for interference avoidance based on signal alignment for MIMO systems. The systems may also use OFDM, OFDMA, or other suitable frequency division, multiplexing, and access techniques. The embodiments include a signal alignment scheme for a MIMO and OFDM or OFDMA system using both spatial and frequency dimensions. The scheme includes at least one existing link between an existing transmitter and an existing receiver. The existing transmitter and receiver may be part of a UE and a base station, or part of any other suitable communication devices. The scheme also includes a new link between a new transmitter and a new receiver. The new link is enabled to share at least some of the resources, e.g., resource elements (REs) or frequency tones, of the existing link. Both existing and new links comprise multiple antennas for transmitting/receiving using MIMO technology. Further, the existing link may use OFDM, OFDMA, or a similar frequency division transmission scheme. The signal alignment scheme avoids interference between a first signal transmitted on the existing link and a second signal transmitted on the new link. The interference between the two signals, on the existing link and the new link, is avoided by ensuring no or sufficiently small overlap in the power spectrums of the two signals as detected by a receiver. The scheme can provide no or sufficiently small signal interference level in detected power, which is referred to herein as substantially interference-free transmission, from the new transmitter to the existing receiver. A number of symbols can be transmitted by the new transmitter without interfering with the existing receiver. The number of used symbols can increase linearly with the number of the transmitter antennas of the new link and the length of CP.

To further improve the performance of the new link, the existing link can reallocate its power and release some spaces to the new link when the existing link's quality-of-service (QoS) requirement can be satisfied. Since the performance of the new link is related to a null space (free or available space for transmissions) generated by the existing link, a throughput maximization problem is formulated to find out an optimal null space that can be released from the existing link without violating the existing link's QoS requirement. The optimal solution can be found using a greedy search algorithm, which may have relatively high computational complexity, such as when the number of subcarriers (e.g., frequencies, frequency tones, or resource elements) and antennas is large. To reduce computational complexity, two alternative (and suboptimal) algorithms can be used instead of the greedy search: small eigenvalue algorithm and a best throughput algorithm. For the small eigenvalue algorithm, the existing link releases the subspaces with smallest eigenvalues to the new link. Instead of only considering the requirement of the existing link during the releasing process, the best throughput algorithm takes the requirement of the new link into account, where the subspaces that provide most rate improvement of the new link are released iteratively. In comparison to the best throughput algorithm, the small eigenvalue algorithm may perform worse but have lower complexity.

FIG. 1 shows an embodiment of a MIMO-OFDM system 100. The system 100 includes at least one existing link 110, with $N_t$ transmitter and $N_r$ receiver antennas. The existing link 110 transmits an OFDM signal from a transmitter 112 (comprising the $N_t$ transmitter antennas) to a receiver 114 (comprising the $N_r$ receiver antennas). The transmitter 112 may include a MIMO encoder and an OFDM modulator for each transmitter antenna. The receiver 114 may include an OFDM demodulator for each receiver antenna and a MIMO decoder. For example, the transmitter 112 and receiver 114 exchange a downlink channel or signal between an existing base station and UE in a cell or macro cell. A new link 120, with $M_t$ transmitter and $M_r$ receiver antennas is enabled to transmit simultaneously with the existing link, e.g., using at least some of the allocated resources or REs of the system 100. The new link 120 is transmitting from a new transmitter 122 (comprising the $M_t$ transmitter antennas) to a new receiver 124 (comprising the $M_r$ receiver antennas). The transmitter 122 may include a precoding block coupled to the transmitter antennas. The receiver 124 may include an OFDM demodulator for each receiver antenna and a MIMO decoder. For example, the transmitter 122 and receiver 124 exchange a downlink channel or signal between new femtocell and UE. Further, in some implementations, any one of the transmitter 112, receiver 114, new transmitter 122, and new receiver 124 may be part of a transceiver comprising both transmitter and receiver components. For instance, a transceiver at a base station or a UE may comprise both a transmitter 112 and a receiver 114. Similarly, a second transceiver at a Femtocell or a second UE may comprise a second transmitter 122 and a second receiver 124. Such transceivers are configured to communicate with similar transceivers at corresponding devices.

The channel between any pair of transmitter and receiver antenna is assumed to be selective and with no more than L+1 taps. The OFDM signal from the existing transmitter 112 has N subcarriers with a CP of size L to combat delay spread of the channel. Thus, the length of the OFDM signal is N+L. Since the existing link is a MIMO system, precoding is conducted on each subcarrier. The signal on the i-th subcarrier after precoding can be expressed as $$x^E[i] = (x_1^E[i] x_2^E[i] \ldots x_t^E[i])^T = C^E[i] s^E[i], \quad (1)$$

where $x^E[i]$ is a $N_t \times 1$ column vector with the k-th element, $x_k^E[i]$ is the transmitter signal from the k-th antenna of the existing transmitter on the i-th subcarrier, $s^E[i]$ is the column vector of the source signal at the existing transmitter on the i-th subcarrier, and $C^E[i]$ is the precoding matrix of the existing transmitter on the i-th subcarrier. The symbol vector on the i-th transmitter antenna after precoding is denoted as $x_i^E[i] = (x_i^E[0] x_i^E[1] \ldots x_i^E[N-1])^T$, which has the length of N. Thus, $x_i^E$ goes through an inverse discrete Fourier transform (IDFT) converter followed by a CP insertion operator. At the receiver side, the CP is removed first and then goes through a discrete Fourier transform (DFT) converter.

The existing receiver receives signals from both the existing and the new transmitters. The received signal at the j-th receiver antenna of the existing receiver after DFT is expressed as $$y_j^E = FB(\Sigma_{i=1}^N \overline{H}_{j,i}^E A F^H x_i^E + \Sigma_i^M \overline{H}_{j,i}^{NE} A F^H x_i^N + n_j^E) \quad (2)$$

where $y_jE = (y_j^E[0] \; y_j^E[1] \ldots y_j^E[N-1])$. In (2), $n_j^E \sim CN(0, \sigma I)$ is an additive white Gaussian noise vector and $x_i^N$ is the transmitted symbol vector on the i-th antenna of the new transmitter. $\overline{H}_{j,i}^E$ is the (N+L)×(N+L) channel matrix from the i-th transmitter antenna to the j-th receiver antenna of the existing link, which can be expressed as $$\overline{H}_{j,i}^E = \begin{pmatrix} h_{j,i,0}^E & 0 & \ldots & 0 & h_{j,i,L}^E & \ldots & \ldots & h_{j,i,1}^E \\ \vdots & \ddots & \ddots & \ddots & \ddots & \ddots & \ddots & \vdots \\ \vdots & \ddots & \ddots & \ddots & \ddots & \ddots & \ddots & h_{j,i,L}^E \\ h_{j,i,L}^E & 0 & \ldots & 0 & h_{j,i,0}^E & 0 & \ldots & 0 \\ 0 & \ddots & \ddots & \ddots & \ddots & \ddots & \ddots & \vdots \\ \vdots & \ddots & \ddots & \ddots & \ddots & \ddots & \ddots & 0 \\ 0 & \ldots & \ldots & 0 & h_{j,i,L}^E & \ldots & \ldots & h_{j,i,0}^E \end{pmatrix}. \quad (3)$$

The channel matrix from the i-th antenna of the new transmitter to the j-th antenna of the existing receiver, $\overline{H}_{j,i}^{NE}$, can be defined similarly. The normalized DFT matrix is defined as $$F = \frac{1}{\sqrt{N}} (e^{-j2\pi \frac{kl}{N}})_{k,l=0}^{N-1}. \quad (4)$$

$F^H$ is the IDFT matrix. A and B are a (N+L)×N CP insertion matrix and a N×(N+L) CP removal matrix, defined as $$A = \begin{pmatrix} O_{L,N-L} & I_L \\ I_L & \end{pmatrix} \text{ and} \quad (5)$$

$$B = (O_{N,L} \quad I_L), \text{ respectively.} \quad (6)$$

The received signal at the existing receiver can be expressed as $$y^E = H^E x^E + H^{NE} x^N + n^E, \quad (7)$$

where $H^E$ and $H^{NE}$ are channel matrices from the existing transmitter and the new transmitter to the existing receiver, respectively. The values $x^E$ and $x^N$ are transmitted signals from the existing transmitter and the new transmitter, respectively.

At the existing receiver, postcoding matrices are applied on each subcarrier, denoted as $D^E[i]$. For the matrix representation, the signals can be mapped on each antenna to its corresponding subcarrier and then $D^E[i]$ is applied. A mapping matrix $T_r$ is used to obtain the post-processed signal vector as $$\tilde{y}^E = D^E T_r y^E + D^E T_r (H^E x^E + H^{NE} x^N + n^E), \text{ where} \quad (8)$$

$$D^E = \text{diag}\{D^E[0], \ldots, D^E[N-1]\}. \quad (9)$$

Similarly, the received signal at the new receiver can be obtained as $$y^N = H^{NN} x^N + H^{EN} x^E + n^N, \quad (10)$$

where $H^{NN}$ and $H^{EN}$ are channel matrices from the new transmitter and the existing transmitter to the new receiver, respectively.

In an embodiment, the existing link is protected and the precoding matrix of the new link is based on signal alignment to generate interference free transmission to the existing link. Channel state information (CSI) may be known to the involved nodes (comprising the existing and new transmitters and receivers). Alternatively, a central node in the system can have all the needed CSI to control the transmissions. In this case, the results can provide an upper bound on the achievable rate.

For the existing link, the precoding and postcoding are conducted on each subcarrier. The received desired signal on the i-th subcarrier is $$y_E^E[i] = H^E[i] x^E[i]. \quad (11)$$

$H^E[i]$ is the equivalent MIMO channel on the i-th subcarrier, expressed as $$H^E[i] = \begin{pmatrix} H_{1,1}^E[i] & \ldots & \ldots & H_{1,N_t}^E[i] \\ H_{2,1}^E[i] & \ldots & \ldots & H_{2,N_t}^E[i] \\ \vdots & \vdots & \ddots & \vdots \\ H_{N_r,1}^E[i] & \ldots & \ldots & H_{N_r,N_t}^E[i] \end{pmatrix}, \text{ where} \quad (12)$$

$$H_{i,j}^E[n] = \sum_{l=0}^{L} h_{j,i,l}^E e^{\frac{-i2\pi nl}{N}}. \quad (13)$$

The value $x^E[i]$ is the transmitted signal on the i-th subcarrier defined in (1), which is $x^E[i] = C^E[i] s^E[i]$. Taking singular-value decomposition (SVD) of $H^E[i]$ results in $$H^E[i] = U^E[i] \Lambda^E[i] (V^E[i])^H. \quad (14)$$

To maximize the data rate of the existing link, the precoding and postcoding matrices are $$C^E[i] = V^E[i] \text{ and} \quad (15)$$

$$D^E[i] = (U^E[i])^H, \text{ respectively.} \quad (16)$$

After designing the interference free transmission from the new link, the post-processed signal on the i-th subcarrier is $$\tilde{y}^E[i] = D^E[i] y^E[i] = \Lambda^E[i] s^E[i] + \tilde{n}^E[i], \quad (17)$$

where $\Lambda^E[i]$ is of size $N_r \times N_t$ with main diagonal $(\lambda_1^E[i], \ldots, \lambda_{\min\{N_t,N_r\}}^E[i])$ such that $(\lambda_1^E[i])^2 \geq \ldots \geq (\lambda_{\min\{N_t,N_r\}}^E[i])^2$. The achievable rate on the i-th subcarrier is $$R^E[i] = \frac{1}{N+L} \sum_{k=1}^{\min\{N_t,N_r\}} \log\left(1 + \frac{P_k^E[i](\lambda_k^E[i])^2}{\sigma^2}\right), \quad (18)$$

where $P_k^E[i]$ is based on water-filling power allocation, which is $$P_k^E[i] = \left(\mu + \frac{\sigma^2}{(\lambda_k^E[i])^2}\right), \quad (19)$$

where $(x)^+ = \max\{0,x\}$ and $\mu$ is chosen to satisfy the total power constraint $\sum_{i=1}^{N} \sum_{k=1}^{\min\{N_t,N_r\}} P_k^E[i] P_{th}^E$. The sum rate of the existing link is $$R^E = \sum_{i=1}^{N} R^E \quad (20)$$

$$= \frac{1}{N+L} \sum_{i=1}^{N} \sum_{k=1}^{\min\{N_t,N_r\}} \log\left(1 + \frac{P_k^E[i](\lambda_k^E[i])^2}{\sigma^2}\right),$$

Thus, the post-processed signal can be expressed as $$\tilde{y}^E[i] = \text{diag}\{\Lambda^E[0], \ldots, \Lambda^E[N-1]\} s^E[i] + D^E T_r n^E. \quad (21)$$

Based on the operations at the existing link, the interference signal at the existing receiver after post-processing is $$\hat{I} = D^E T_r H^{NE} x^N = D^E T_r H^{NE} C^N s^N, \quad (22)$$

where $C^N$ and $s^N$ are the precoding matrix and the source signal vector at the new transmitter, respectively. To generate interference free transmission to the existing link, the transmitted signal of the new link uses the null space of the existing link. The precoding matrix $C^N$ satisfies the following condition $$\tilde{H}^{NE} C^N = 0, \quad (23)$$

where $\tilde{H}^{NE}$ contains the rows of $D^E T_r H^{NE}$ that satisfy the corresponding $P_k^E[i] \neq 0$. Thus, the $C^N$ can be chosen as $$C^N \in \text{null}(\tilde{H}^{NE}). \quad (24)$$

To determine $C^N$, the SVD of $\tilde{H}^{NE}$ is computed as $\tilde{H}^{NE} = U_{\tilde{H}^{NE}} \Lambda_{\tilde{H}^{NE}} V_{\tilde{H}^{NE}}$ and then $$C^N v_{\text{rank}(\tilde{H}^{NE})} | \ldots | v_{M_t(N+L)}] \quad (25)$$

where $v_i$ is the i-th column of $V_{\tilde{H}^{NE}}$. From (24), the number of symbols that can be transmitted by the new link without interfering with the existing OFDM block depends on the rank of the null space of $\tilde{H}^{NE}$.

In a case of multiple antennas at the new link and a single antenna at the existing link ($N_t = N_r = 1$, $M_t$; $M_r \geq 2$), when $P_1^E[i] \neq 0$ for all subcarriers or the power allocation scheme of the existing link is unknown at the new link, all N subcarriers may be used by the existing link. Thus, the rank of the null space of $\tilde{H}^{NE}$ is $$d = |\text{null}(\tilde{H}^{NE})| = M_t(N+L) - N, \quad (26)$$

which is the number of symbols that can be transmitted by the new link without interfering with the existing link. When $M_t = 1$, the result is $d = L$ symbols. With the increase of the number of transmitting antennas at the new transmitter, the number of symbols that can be transmitted without interfering with the existing link increases linearly.

When the instantaneous channels on some subcarriers are not good enough (the channels do not have sufficient or acceptable signal quality), the existing transmitter may not transmit a signal on those subcarriers to save power for other ones, which also increases the rank of the null space for the new link. In this case, the rank of the null space is $$d = |\text{null}(\tilde{H}^{NE})| = M_t(N+L) - m, \quad (27)$$

where $m = \sum_{i=1}^{N} 1_{\{P_1^E[i] \neq 0\}}$ and $$1_{\{P_1^E[i] \neq 0\}} = \begin{cases} 1 & P_1^E[i] \neq 0 \\ 0 & \text{otherwise} \end{cases}. \quad (28)$$

Comparing (26) and (27), more symbols can be transmitted by the new link without interfering with the existing link if the power allocation scheme of the existing link is known since $m \leq N$.

In a case of multiple antennas at both existing and new links with $N_r \geq 2$ and $M_t = 1$, when the power allocation scheme is unknown at the new transmitter, it is impossible or difficult to generate interference-free transmission since $$d = |\text{null}(\tilde{H}^{NE})| = [(N+L) - N_r N]^+ = 0 \quad (29)$$

If $N_r = 1$, the maximal rank of the existing link is $$\max\{m\} = \max\{\sum_{i=1}^{N} 1_{\{P_1^E[i] \neq 0\}}\} = N. \quad (30)$$

In this case, if the power allocation scheme of the existing link is known at the new transmitter, the new link can still transmit L symbols without interfering with the existing link, e.g., d=L.

If both existing and new links are equipped with multiple antennas and the power allocation scheme of the existing link is known at the new transmitter, the number of symbols that can be transmitted by the new link without interfering with the existing link can be expressed as $$d = |\text{null}(\tilde{H}^{NE})| = M_t(N+L) - \sum_{i=1}^{N} \sum_{k=1}^{\min\{N_t, N_r\}} 1_{\{P_k^E[i] \neq 0\}}. \quad (31)$$

According to (31), the number of symbols that can be transmitted by the new link without interfering with the existing link increases linearly with the number of transmitter antennas of the new link and the length of the CP. The number of symbols can be further increased if the existing transmitter assigns no power at some subcarriers (e.g., with bad channel conditions).

Without considering the interference constraint, the number of symbols that can be decoded at the receiver side is $$d_r = M_r N. \quad (32)$$

By taking both interference and decoding capability constraints into consideration, the number of symbols that can be transmitted for the new link is $$d_t = \min\{d_r, d\} = \min\{M_r N, M_t(N+L) - \sum_{i=1}^{N} \sum_{k=1}^{\min\{N_t, N_r\}} 1_{\{P_k^E[i] \neq 0\}}\}. \quad (33)$$

According to (33), if the number of antennas at the new receiver is large enough, the number of symbols that can be transmitted by the new link is as described above. Otherwise, the number of symbols that can be transmitted by the new link is restricted by the decoding capability of the new receiver.

The precoding matrix of the new transmitter is designed to null the interference to the existing link. However, the new receiver suffers from the interference from the existing transmitter. A postcoding matrix needs to be designed to minimize the impact. The postcoding matrix at the new receiver is denoted $D^N$. As such, the post-processed signal is $$\hat{y}^N = D^N (H^{NN} C^N s^N + H^{EN} x^E + n^N). \quad (34)$$

The covariance matrix of the interference signal and the noise can be expressed as $$Q = H^{EN} T_t C^E P^E (T_t C^E)^H (H^{EN})^H + \sigma I, \quad (35)$$

where $P^E = E[s^E (s^E)^H]$. Given the power allocation matrix of $s^E$ and sufficiently accurate CSI, the optimal postcoding matrix to maximize rate is a whitening filter $$D^N = Q^{-\frac{1}{2}}. \quad (36)$$

The power allocation matrix of the new link can be designed to maximize the overall data transmission rate, which can be expressed as $$\max_{P^N} R^N \text{ s.t. } \text{Trace}\{C^N P^N (C^N)^H\} \leq P_{th}^N \text{ where} \quad (37)$$

$$R^N = \frac{1}{N+L} \log_2 |I + Q^{-\frac{1}{2}} H^{NN} C^N P^N (C^N)^H (H^{NN})^H Q^{-\frac{1}{2}}|,$$

where $P^N = E[s^N (s^N)^H]$ and $P_{th}^N$ is the total power constraint at the new transmitter. To solve this optimization problem, a new power allocation matrix is defined as $$\tilde{P}^N = \left((C^N)^H C^N\right)^{\frac{1}{2}} P^N \left((C^N)^H C^N\right)^{\frac{1}{2}}. \quad (38)$$

As such, the optimization problem becomes $$\max_{\tilde{P}^N} = \frac{1}{N+L} \log_2 |I + \tilde{Q}\tilde{P}^N \tilde{Q}^H| \text{ s.t. } \operatorname{Trace}(\tilde{P}^N) \leq P_{th}^N.$$

where $\tilde{Q} = Q^{-\frac{1}{2}} H^{NN} C^N \left((C^N)^H C^N\right)^{\frac{1}{2}}$.

Applying SVD on $\tilde{Q}$ results in $\tilde{Q} = U_{\tilde{Q}} \Lambda_{\tilde{Q}} V_{\tilde{Q}H}$, where $\Lambda_{\tilde{Q}}$ contains the singular values $\lambda_{i,\tilde{Q}}$. Thus, the optimal solution $\hat{P}^{N,*} = V_{\tilde{Q}}^H \tilde{P}^N V_{\tilde{Q}}$ is $$\hat{P}^{N,*}(n,n) = \left(\rho - \frac{1}{\lambda_{i,\tilde{Q}}^2}\right)^+, \quad (39)$$

where $\rho$ is determined to satisfy $\Sigma \hat{P}^{N,*}(n,n) = P_{th}^N$. Thus, the optimal power allocation matrix $P^N$ is $$P^N = \left((C^N)^H C^N\right)^{-\frac{1}{2}} V_{\tilde{Q}} \hat{P}^{N,*} V_{\tilde{Q}}^H \left((C^N)^H C^N\right)^{-\frac{1}{2}}. \quad (40)$$

Based on the above design, the data rate of the new link is maximized and the new link is substantially interference-free to the existing one.

In an embodiment, to further improve the performance of the new link, the existing link is further configured to release more or optimal null space for the new link, e.g., as long as the existing link's QoS requirement is satisfied. In this case, there exists some collaboration between the existing and the new link. The objective is to maximize the data rate of the new link while guaranteeing the data rate of the existing link. The interference-free transmission from the new transmitter to the existing receiver can be defined as described above. Additionally, the existing link is configured to assign no or zero power to those channels with bad channel conditions. The existing link can also assign more power for the remaining channels with good conditions. In that case, the rank of the null space is further increased and the new link can transmit more symbols.

Mathematically, the problem can be formulated as $$\max_{P_k^E[i], C^N, P^N} R^N, \quad (41)$$

$$\text{s.t. } R^E \geq R_{th}^E, \quad (42)$$

$$\sum_{i=1}^{N} \sum_{k=1}^{\min\{N_t, N_r\}} P_k^E[i] \leq P_{th}^E, \quad (43)$$

$$\operatorname{Trace}\{C^N P^N (C^N)^H\} \leq P_{th}^N. \quad (44)$$

The first constraint above is the rate requirement of the existing link, which represents its QoS requirement. The second and the third constraints are the total power constraints at the existing link and the new link, respectively. The problem can be solved in two steps. First, the power allocation of the existing link, $P_k^E[i]$, is determined. After the power allocation of the existing link is determined, the null space for the new link is determined. The precoding and postcoding operations for the new link can be obtained as described above.

In an embodiment, the optimal solution to determine the power allocation of the existing link can be found using a greedy search algorithm. Accordingly, for a set of $$(\mathfrak{R}, \mathfrak{I}) \subset \{(1,1), \ldots, (1,N), \ldots, (\min\{N_t, N_r\}, N)\},$$

let $P_k^E[i] = 0$ for $(k,i) \in (\mathfrak{R}, \mathfrak{I})$. The water-filling power allocation is used on other subspaces, such that $$P_k^E[i] = \begin{cases} 0, & (k,i) \in (\mathfrak{R}, \mathfrak{I}) \\ P_k^E[i] = \left(\mu - \frac{\sigma^2}{(\lambda_k^E[i])^2}\right)^+, & \text{otherwise} \end{cases}, \quad (45)$$

where $\mu$ is chosen to satisfy the total power constraint $\Sigma_{i=1}^N \Sigma_{k=1}^{\min\{N_t, N_r\}} P_k^E[i] \leq P_{th}^E$. Based on the power allocation result, if the rate requirement of the existing link is satisfied, the power allocation is considered a candidate. Hence, the rate of the new link is calculated for all candidates. The optimal solution is the one that provides the largest rate for the new link. With the increase of the number of subcarriers, N, and the number of antennas, the complexity of the greedy search substantially increases. To limit the computational complexity while keeping the performance, other algorithms can be used instead.

In another embodiment, a small eigenvalue algorithm is used to determine the power allocation of the existing link. This algorithm is based on a simpler solution where the subspaces with small eigenvalues are released by the existing link to the new link. At initialization, $P_k^E[i]$ is calculated as the case without the new link. If the QoS requirement of the existing link cannot be satisfied, the operation at the new link is the same as the case without releasing more or optimal null space for the new link (as described above). Otherwise, the existing link can release additional subspaces.

At each next l-th iteration, $\lambda_k^E[i]$ is rearranged in an increasing order. Each iteration finds a number of $\lambda_j^E[t]$ that each satisfies $P_j^E[t] \neq 0$ and has $P_k^E[i] = 0$ for all $\lambda_k^E[i] < \lambda_j^E[t]$. The number of $\lambda_j^E[t]$ is decided as suitable to improve performance or speed computation convergence. This means that $\lambda_j^E[t]$ is the smallest eigenvalue that has $P_j^E[t] \neq 0$. Setting $P_j^E[t] = 0$, the power allocation is recalculated as $$P_k^E[i] = \begin{cases} 0, & \lambda_k^E[i] < \lambda_j^E[t] \\ P_k^E[i] = \left(\mu - \frac{\sigma^2}{(\lambda_k^E[i])^2}\right)^+, & \text{otherwise} \end{cases}, \quad (46)$$

where $\mu$ is chosen to satisfy the total power constraint $\Sigma_{i=1}^N \Sigma_{k=1}^{\min\{N_t, N_r\}} P_k^E[i] \leq P_{th}^E$. If the QoS requirement can be satisfied using this new power allocation result, the power allocation is updated and this update process is repeated at the next iteration. Otherwise, the power allocation result from the (l−1)-th iteration (last iteration) is used and the updating (iteration process) is stopped. The small eigenvalue algorithm can guarantee the QoS requirement of the existing link and is simpler to implement than the greedy search algorithm. However, the small eigenvalue algorithm only considers the rate requirement of the existing link during the null space releasing procedure. This can be improved by taking the new link's requirement into account, as described below.

In an embodiment, a best throughput algorithm is used to determine the power allocation of the existing link. The algorithm takes into account both the QoS requirement of the existing link and the rate of the new link. In the best throughput algorithm, the existing link releases one or more subspaces in one iteration, similar to the small eigenvalue algorithm. However, instead of using the subspace with smallest eigenvalue, the existing link releases the subspace that can provide most rate improvement of the new link. At a first iteration or initialization step, the same procedure as the small eigenvalue algorithm is implemented. At each next iteration, all the subspaces that satisfy $P_k^E[i] \neq 0$ are obtained using $(\Re,\Im)=\{\{k,i\}|P_k^E[i]\neq 0\}$. For each component in $(\Re,\Im)$, $P_k^E[i]$ is set as $$P_k^E[i] = \begin{cases} 0, & (k,i) \cup (R, \Im)^c \\ P_k^E[i] = \left(\mu - \frac{\sigma^2}{(\lambda_k^E[i])^2}\right)^+, & \text{otherwise} \end{cases} \quad (47)$$

where $\mu$ is chosen to satisfy the total power constraint $\Sigma_{i=1}^N \Sigma_{k=1}^{min\{N_t,N_r\}} P_k^E[i] \leq P_{th}^E$. The power allocation result from (47) is denoted as $P^E(k,i)$. The rate of the existing link is calculated based on the new power allocation scheme $P^E(k,i)$ for each component, denoted as $R_{k,i}^E$.

Let $$(\Re,\tilde{\Im})=\{(\tilde{k},\tilde{i})|R_{\tilde{k},\tilde{i}}^E \geq R_{th}^E\}. \quad (48)$$

If $(\Re, \tilde{\Im})=\emptyset$, then the updating process (or iteration) is stopped. Otherwise, the rate of the new link is calculated for each component in $(\Re, \tilde{\Im})$ based on its corresponding power allocation result $P^E(\tilde{k},\tilde{i})$, denoted as $R^N(\tilde{k}, \tilde{i})$ $$(k^*,i^*)=\arg\max R^N(\tilde{k},\tilde{i}) \quad (49)$$

the value $P_{k^*}^E[i^*]$ is set, and the updating is repeated. Based on the best throughput algorithm, the QoS requirement of the existing link can be satisfied.

Figure 2:
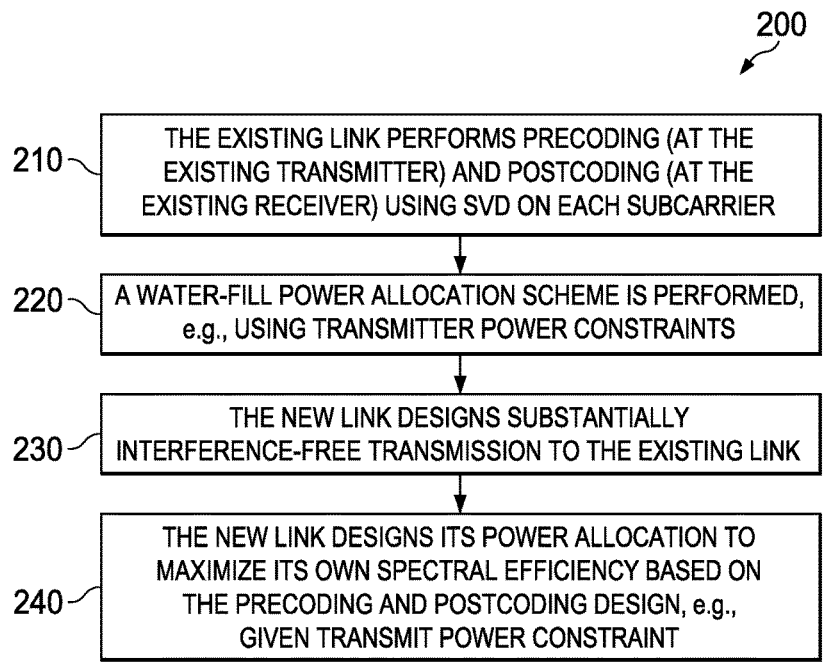
FIG. 2 is a process flow of an embodiment method for interference avoidance based on signal alignment for MIMO.

FIG. 2 shows an embodiment method 200 for interference avoidance based on signal alignment for a MIMO system. The system may also use OFDM or OFDMA transmission. The method 200 may be implemented by an existing link (e.g., existing transmitter and receiver) and a new link (e.g., new transmitter and receiver). At step 210, the existing link performs precoding (at the existing transmitter) and postcoding (at the existing receiver) using SVD on each subcarrier. At step 220, a water-filling power allocation scheme is performed, e.g., using transmitter power constraints. Steps 210 and 220 optimize the spectral efficiency on the existing link. At step 230, the new link designs substantially interference-free transmission to the existing link. The new transmitter calculates a precoding matrix to null interference to the existing link. The new receiver calculates a postcoding matrix for whitening interference from the existing link. The precoding and postcoding determines an upper bound on spectral efficiency. At step 240, the new link designs its power allocation to maximize its own spectral efficiency based on the precoding and postcoding design, e.g., given transmit power constraint. The new link finds a degree of freedom (or possible null space) that can be used for power allocation of transmission on the new link. The degree of freedom can be found as $$M_t(N+L) - \sum_{i=1}^{N} \sum_{k=1}^{min\{N_t,N_r\}} 1_{\{P_k^E[i]\neq 0\}} \text{ where}$$

$$1_{\{P_k^E[i]\neq 0\}} = \begin{cases} 1 & P_k^E[i] \neq 0 \\ 0 & \text{otherwise} \end{cases}$$

where $P_k^E[i]$ is the power allocated by the existing link on the k-th Eigen direction of the i-th subcarrier.

Figure 3:
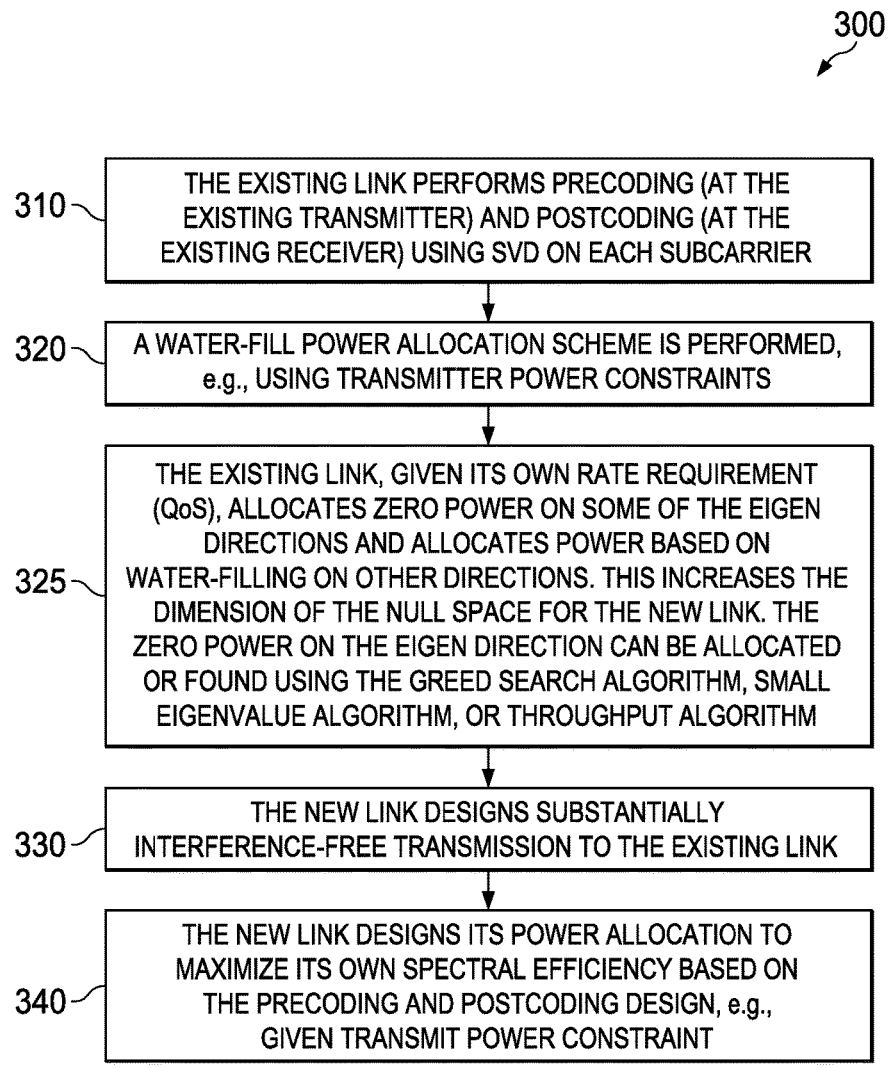
FIG. 3 is a process flow of an embodiment method for interference avoidance based on signal alignment for MIMO.

FIG. 3 shows another embodiment method 300 for interference avoidance based on signal alignment for a MIMO system. The system may also use OFDM transmission. The method 300 may be implemented by an existing link (e.g., existing transmitter and receiver) and a new link (e.g., new transmitter and receiver). At step 310, the existing link performs precoding (at the existing transmitter) and postcoding (at the existing receiver) using SVD on each subcarrier. At step 320, a water-fill power allocation scheme is performed, e.g., using transmitter power constraints. Steps 310 and 320 optimize the spectral efficiency on the existing link. Next, at step 325, the existing link, given its own rate requirement (QoS), allocates zero power on some of the Eigen directions and allocates power based on water-filling on other directions. This increases the dimension of the null space for the new link. The zero power on the Eigen direction can be allocated or found using the greed search algorithm, small eigenvalue algorithm, or throughput algorithm. The greedy search maximizes spectral efficiency of the new link but has relatively high complexity. The small eigenvalue algorithm allocates zero power on the Eigen functions with smallest eigenvalues and is simpler to implement, but does not take the new link into account during releasing the null space. The best throughput algorithm takes the new link into account, releases directions that can increase spectral efficiency to the new link, and achieves more balance between complexity and performance.

At step 330, the new link designs substantially interference-free transmission to the existing link. The new transmitter calculates a precoding matrix to null interference to the existing link. The new receiver calculates a postcoding matrix for whitening interference from the existing link. The precoding and postcoding determines an upper bound on spectral efficiency. At step 340, the new link designs its power allocation to maximize its own spectral efficiency based on the precoding and postcoding design, e.g., given transmit power constraint. The new link finds a degree of freedom that can be used for power allocation of transmission on the new link. The degree of freedom can be found as $$M_t(N+L) - \sum_{i=1}^{N} \sum_{k=1}^{min\{N_t,N_r\}} 1_{\{P_k^E[i]\neq 0\}} \text{ where}$$

$$1_{\{P_k^E[i]\neq 0\}} = \begin{cases} 1 & P_k^E[i] \neq 0 \\ 0 & \text{otherwise} \end{cases}$$

where $P_k^E[i]$ is the power allocated by the existing link on the k-th Eigen direction of the i-th subcarrier. The null space released by the existing link provides more freedom for power allocation to the new link.

Figure 4:
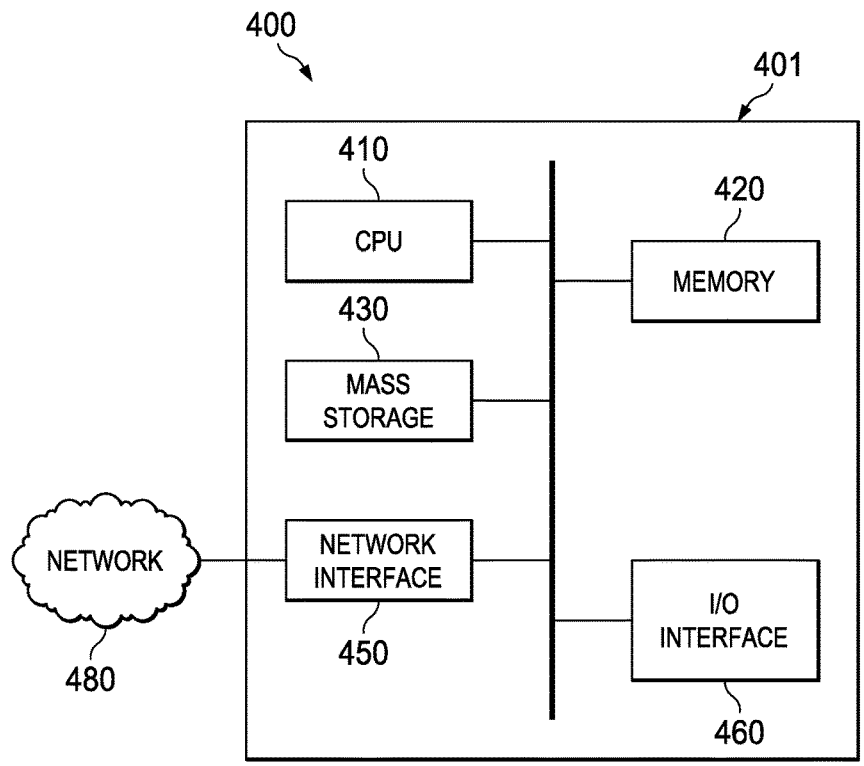
FIG. 4 is a diagram of a processing system that can be used to implement various embodiments.

FIG. 4 is a block diagram of an exemplary processing system 400 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 400 may comprise a processing unit 401 equipped with one or more input/output devices, such as a network interfaces, storage interfaces, and the like. The processing unit 401 may include a central processing unit (CPU) 410, a memory 420, a mass storage device 430, and an I/O interface 460 connected to a bus. The bus may be one or more of any type of several bus architectures including a memory bus or memory controller, a peripheral bus or the like.

The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs. In embodiments, the memory 420 is non-transitory. The mass storage device 430 may comprise any type of storage device configured to store data, programs, and other information and to make the data, programs, and other information accessible via the bus. The mass storage device 430 may comprise, for example, one or more of a solid state drive, hard disk drive, a magnetic disk drive, an optical disk drive, or the like.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method, by a network component, for generating new links for communications in a wireless network that avoid interference to existing links, the method comprising:
   identifying a cyclic prefix in a primary transmission over an existing link between multiple antennas at an existing transmitter and multiple antennas at an existing receiver;
   determining how many combinations of space and frequency resources are available for secondary transmission over the existing link based on a length of the cyclic prefix in the primary transmission, wherein more combinations of space and frequency resources are available for secondary transmission when the length of the cyclic prefix in the primary transmission is longer than when the length of the cyclic prefix in the primary transmission is shorter;
   assigning a secondary transmission over a new link, between a new transmitter and a new receiver, at one or more of the combinations of space and frequency resources available for secondary transmission, wherein the secondary transmission is distinguishable from the primary transmission at the existing receiver;
   determining channel precoding to be implemented at the new transmitter and channel postcoding to be implemented at the existing receiver to reduce interference from the secondary transmission to the primary transmission, the channel precoding and the channel postcoding determined in accordance with the combination of space and frequency resources available for the secondary transmission; and
   allocating power for the secondary transmission on the new link in accordance with the channel precoding, the channel postcoding, and a transmitter power constraint of the existing link.

2. The method of claim 1, wherein the power is allocated for the secondary transmission to increase data rates on the new link.

3. The method of claim 1 further comprising:
   receiving, from the existing receiver, a null space of zero power allocation on at least one of the space resources available for secondary transmission; and
   selecting the null space of zero power allocation for the secondary transmission from the new transmitter to improve spectral efficiency on the new link.

4. The method of claim 1 further comprising transmitting signals on the new link using multiple-input and multiple-output (MIMO) for multi-antenna transmissions and orthogonal frequency-division multiplexing (OFDM) technology.

5. A network component for a new transmitter configured for generating new links for communications in a wireless network that avoid interference to existing links, the network component comprising:
   at least one processor; and
   a computer readable storage medium storing programming for execution by the at least one processor, the programming including instructions to:
   identify a cyclic prefix in a primary transmission over an existing link between multiple antennas at an existing transmitter and multiple antennas at an existing receiver;
   determine how many combinations of space and frequency resources are available for secondary transmission over the existing link based on a length of the cyclic prefix in the primary transmission, wherein more combinations of space and frequency resources are available for secondary transmission when the length of the cyclic prefix in the primary transmission is longer than when the length of the cyclic prefix in the primary transmission is shorter;
   assign a secondary transmission over a new link, between a new transmitter and a new receiver, at one or more of the combinations of space and frequency resources available for secondary transmission, wherein the secondary transmission is distinguishable from the primary transmission at the existing receiver;
   determine channel precoding to be implemented at the new transmitter and channel postcoding to be implemented at the existing receiver to reduce interference from the secondary transmission to the primary transmission, the channel precoding and the channel postcoding determined in accordance with the combination of space and frequency resources available for the secondary transmission; and allocate power for the secondary transmission on the new link in accordance with the channel precoding, the channel postcoding, and a transmitter power constraint of the existing link.

6. The network component of claim 5, wherein at least one of the new transmitter and the new receiver is a component in a femtocell or a user equipment (UE), and wherein at least one of the existing transmitter and the existing receiver is a component in a base station or a second UE.

7. The network component of claim 5, wherein at least one of the new transmitter and the new receiver is part of a transceiver comprising both transmitter and receiver components.

8. The network component of claim 5, wherein the new transmitter further comprises multiple antennas configured for multiple-input and multiple-output (MIMO) and orthogonal frequency-division multiplexing (OFDM) transmissions.

9. A method, by a network component, for generating new links for communications in a wireless network that avoid interference to existing links, the method comprising:

identifying a cyclic prefix in a primary transmission over an existing link between multiple antennas at an existing transmitter and multiple antennas at an existing receiver;

determining how many combinations of space and frequency resources are available for secondary transmission over the existing link based on a length of the cyclic prefix in the primary transmission, wherein more combinations of space and frequency resources are available for secondary transmission when the length of the cyclic prefix in the primary transmission is longer than when the length of the cyclic prefix in the primary transmission is shorter;

assigning a secondary transmission over a new link, between a new transmitter and a new receiver, at one or more of the combinations of space and frequency resources available for secondary transmission, wherein the secondary transmission is distinguishable from the primary transmission at the existing receiver;

determining channel precoding to be implemented at the existing transmitter and channel postcoding to be implemented at the new receiver to reduce interference from the primary transmission to the secondary transmission, the channel precoding and the channel postcoding determined in accordance with the combination of space and frequency resources assigned to the secondary transmission; and allocating power for secondary transmissions on the new link in accordance with the channel postcoding, the channel precoding, and a transmitter power constraint of the existing link.

10. The method of claim 9, wherein the power is allocated for the secondary transmission to increase data rates on the new link.

11. The method of claim 9 further comprising:

receiving, from the existing receiver, a null space of zero power allocation on at least one of the space resources available for secondary transmission; and selecting the null space of zero power allocation for the secondary transmission from the new transmitter to improve spectral efficiency on the new link.

12. The method of claim 9 further comprising transmitting signals on the new link using multiple-input and multiple-output (MIMO) for multi-antenna transmissions and orthogonal frequency-division multiplexing (OFDM) technology.

13. A network component for a new transmitter configured for generating new links for communications in a wireless network that avoid interference to existing links, the network component comprising:

at least one processor; and a computer readable storage medium storing programming for execution by the at least one processor, the programming including instructions to:

identify a cyclic prefix in a primary transmission over an existing link between multiple antennas at an existing transmitter and multiple antennas at an existing receiver;

determine how many combinations of space and frequency resources are available for secondary transmission over the existing link based on a length of the cyclic prefix in the primary transmission, wherein more combinations of space and frequency resources are available for secondary transmission when the length of the cyclic prefix in the primary transmission is longer than when the length of the cyclic prefix in the primary transmission is shorter;

assign a secondary transmission over a new link, between a new transmitter and a new receiver, at one or more of the combinations of space and frequency resources available for secondary transmission, wherein the secondary transmission is distinguishable from the primary transmission at the existing receiver;

determine channel precoding to be implemented at the existing transmitter and channel postcoding to be implemented at the new receiver to reduce interference from the primary transmission to the secondary transmission, the channel precoding and the channel postcoding determined in accordance with the combination of space and frequency resources assigned to the secondary transmission; and allocate power for the secondary transmission on the new link in accordance with the channel postcoding, the channel precoding, and a transmitter power constraint of the existing link.

14. The network component of claim 13, wherein at least one of the new transmitter and the new receiver is a component in a femtocell or a user equipment (UE), and wherein at least one of the existing transmitter and the existing receiver is a component in a base station or a second UE.

15. The network component of claim 13, wherein at least one of the new transmitter and the new receiver is part of a transceiver comprising both transmitter and receiver components.

16. The network component of claim 13, wherein the new transmitter further comprises multiple antennas configured for multiple-input and multiple-output (MIMO) and orthogonal frequency-division multiplexing (OFDM) transmissions.

* * * * *